US011647554B2

(12) United States Patent
Jones

(10) Patent No.: US 11,647,554 B2
(45) Date of Patent: May 9, 2023

(54) INTELLIGENT CARRIER AGGREGATION IN MILLIMETER WAVE RESOURCES

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/129,827

(22) Filed: Dec. 21, 2020

(65) Prior Publication Data
US 2022/0201783 A1 Jun. 23, 2022

(51) Int. Cl.
*H04W 76/15* (2018.01)
*H04W 28/02* (2009.01)
*H04W 24/08* (2009.01)

(52) U.S. Cl.
CPC ........... *H04W 76/15* (2018.02); *H04W 24/08* (2013.01); *H04W 28/0289* (2013.01)

(58) Field of Classification Search
CPC ........... H04W 52/0206; H04W 52/216; H04W 52/0219; H04W 76/38; H04W 76/10; H04W 24/08; H04W 76/18; H04W 76/36; H04W 72/048; H04W 80/10; H04W 36/0022; H04W 72/085; H04W 76/14; H04W 28/0231
(Continued)

(56) References Cited

U.S. PATENT DOCUMENTS 9,801,228 B2 * 10/2017 Bangolae ............ H04W 72/048
10,420,167 B2 * 9/2019 Ji ............................ H04W 76/38
(Continued)

FOREIGN PATENT DOCUMENTS

| WO | WO-2017126942 A1 * | 7/2017 | ........ H04W 36/0022 |
| WO | WO-2021034763 A1 * | 2/2021 | ........... H04L 1/1893 |
| WO | WO-2021146702 A1 * | 7/2021 | ........... H04L 1/1819 |

OTHER PUBLICATIONS

H. Shariatmadari, S. Iraji, R. Jantti, P. Popovski, Z. Li and M. A. Uusitalo, "Fifth-Generation Control Channel Design: Achieving Ultrareliable Low-Latency Communications," in IEEE Vehicular Technology Magazine, vol. 13, No. 2, pp. 84-93, Jun. 2018, doi: 10.1109/MVT.2018.2814378. (Year: 2018).*
(Continued)

*Primary Examiner* — William D Cumming
(74) *Attorney, Agent, or Firm* — Lee & Hayes, P.C.

(57) ABSTRACT

Systems, methods, and devices can be utilized to aggregate downlink millimeter wave (mmWave) frequency resources based on various conditions. In an example method, a connection request for downlink data is received from a user equipment (UE). The example method includes determining that a first congestion level of a first mmWave downlink channel is below a first threshold and determining that a second congestion level of a second mmWave downlink channel is below a second threshold. An activation request is transmitted to the UE. The activation request instructs the UE to activate a first antenna corresponding to the first mmWave downlink channel and to activate a second antenna corresponding to the second mmWave downlink channel. At least a portion of the downlink data is transmitted to the UE over the first mmWave downlink channel and the second mmWave downlink channel.

17 Claims, 5 Drawing Sheets

(58) Field of Classification Search
USPC .......................................... 370/235, 235.329
See application file for complete search history.

(56) References Cited

U.S. PATENT DOCUMENTS

| | | | |
|---|---|---|---|
| 10,790,939 B2 | 9/2020 | Xing et al. | |
| 10,811,765 B2* | 10/2020 | Huh | H01Q 3/24 |
| 2014/0321282 A1 | 10/2014 | Pragada et al. | |
| 2015/0029858 A1* | 1/2015 | Xu | H04W 52/0206 |
| | | | 370/235 |
| 2016/0029426 A1* | 1/2016 | Bangolae | H04W 76/18 |
| | | | 370/329 |
| 2019/0253967 A1* | 8/2019 | Xiao | H04W 52/0216 |
| 2019/0253968 A1* | 8/2019 | Xiao | H04W 52/0219 |
| 2019/0357276 A1* | 11/2019 | Hu | H04W 76/10 |
| 2019/0380167 A1* | 12/2019 | Cheng | H04W 80/10 |
| 2020/0107213 A1* | 4/2020 | Park | H04L 43/12 |
| 2020/0127771 A1 | 4/2020 | Papasakellariou | |
| 2020/0177346 A1 | 6/2020 | Xing et al. | |
| 2020/0177347 A1 | 6/2020 | Xing et al. | |
| 2020/0212547 A1* | 7/2020 | Huh | H01Q 21/29 |
| 2020/0314704 A1 | 10/2020 | Abdel Shahid et al. | |
| 2021/0068187 A1* | 3/2021 | Baghel | H04W 76/19 |
| 2021/0105787 A1* | 4/2021 | Park | H04L 41/0803 |
| 2021/0105812 A1* | 4/2021 | Rastegardoost | H04L 1/1671 |

OTHER PUBLICATIONS

A. Kitana, I. Traore and I. Woungang, "Impact of base transceiver station selection mechanisms on a mobile botnet over a LTE network," 2016 11th International Conference on Malicious and Unwanted Software (MALWARE), Oct. 2016, pp. 1-9, doi: 10.1109/MALWARE.2016.7888726. (Year: 2016).*

Ericsson, "Carrier Aggregration in 5G," retrieved from «https://www.ericsson.com/en/networks/offerings/5g/carrier-aggregation», on Sep. 24, 2020, 4 pages.

3rd Generation Partnership Project, "Technical Specification Group Radio Access Network; NR and NG-RAN Overall Description", vo. RAN WG2, No. V16.3.0, Oct. 2, 2020, pp. 1-148.

Extended European Search Report dated May 16, 2022 for European Patent Application No. 21210544.9, 9 pages.

* cited by examiner

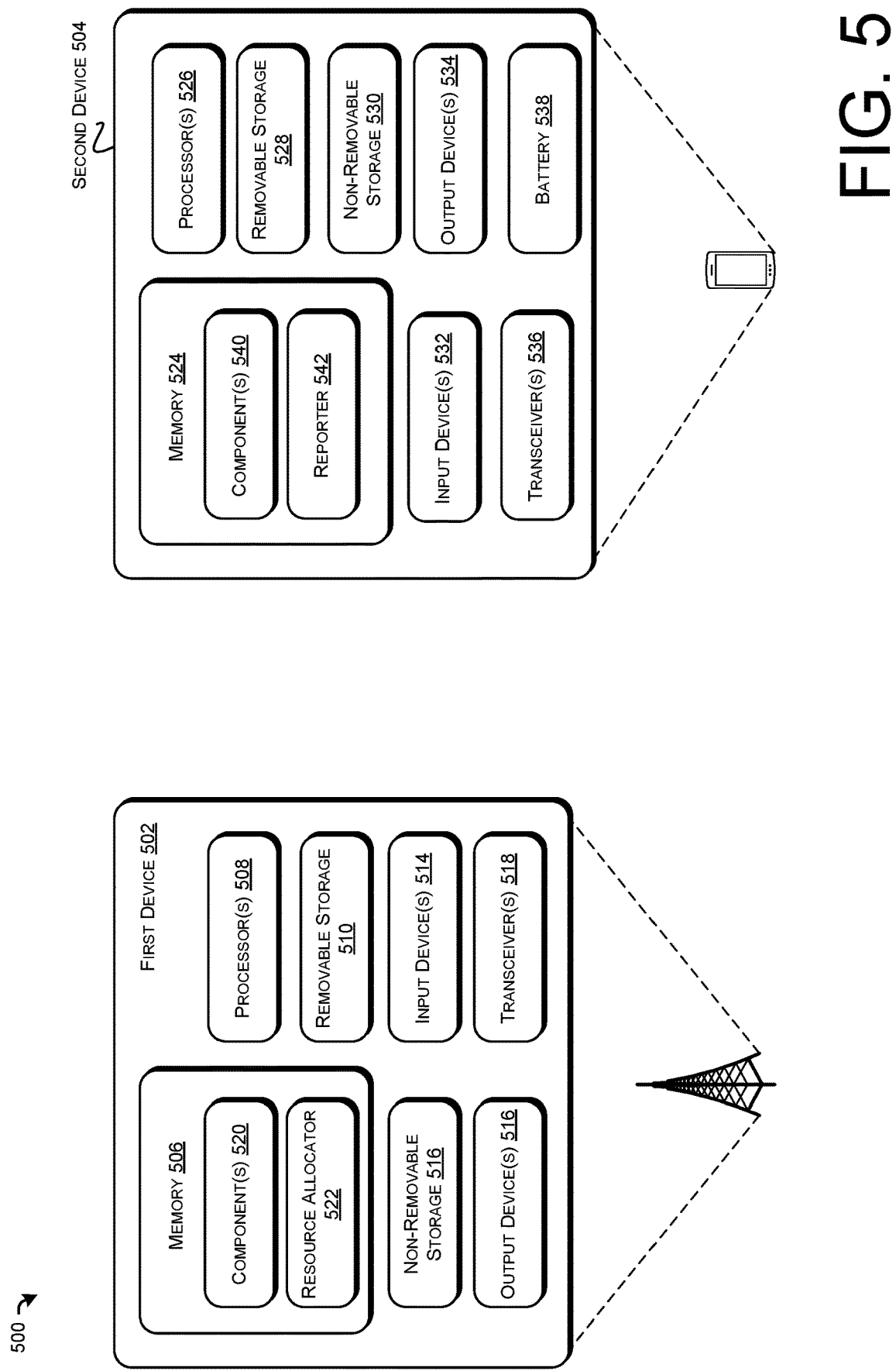

INTELLIGENT CARRIER AGGREGATION IN MILLIMETER WAVE RESOURCES

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Fifth generation (5G) cellular-wireless access technologies provide improved bandwidth and decreased response times to a multitude of devices that may be connected to a network. In particular, 5G radio access networks (RANs) may utilize high-frequency, millimeter wave (mmWave) resources to wirelessly transmit and receive data.

BRIEF DESCRIPTION OF THE DRAWINGS

The detailed description is set forth with reference to the accompanying figures.

FIG. 5 illustrates an example of a system that includes a first device configured to deliver downlink data to a second device.

DETAILED DESCRIPTION

Figure 1:
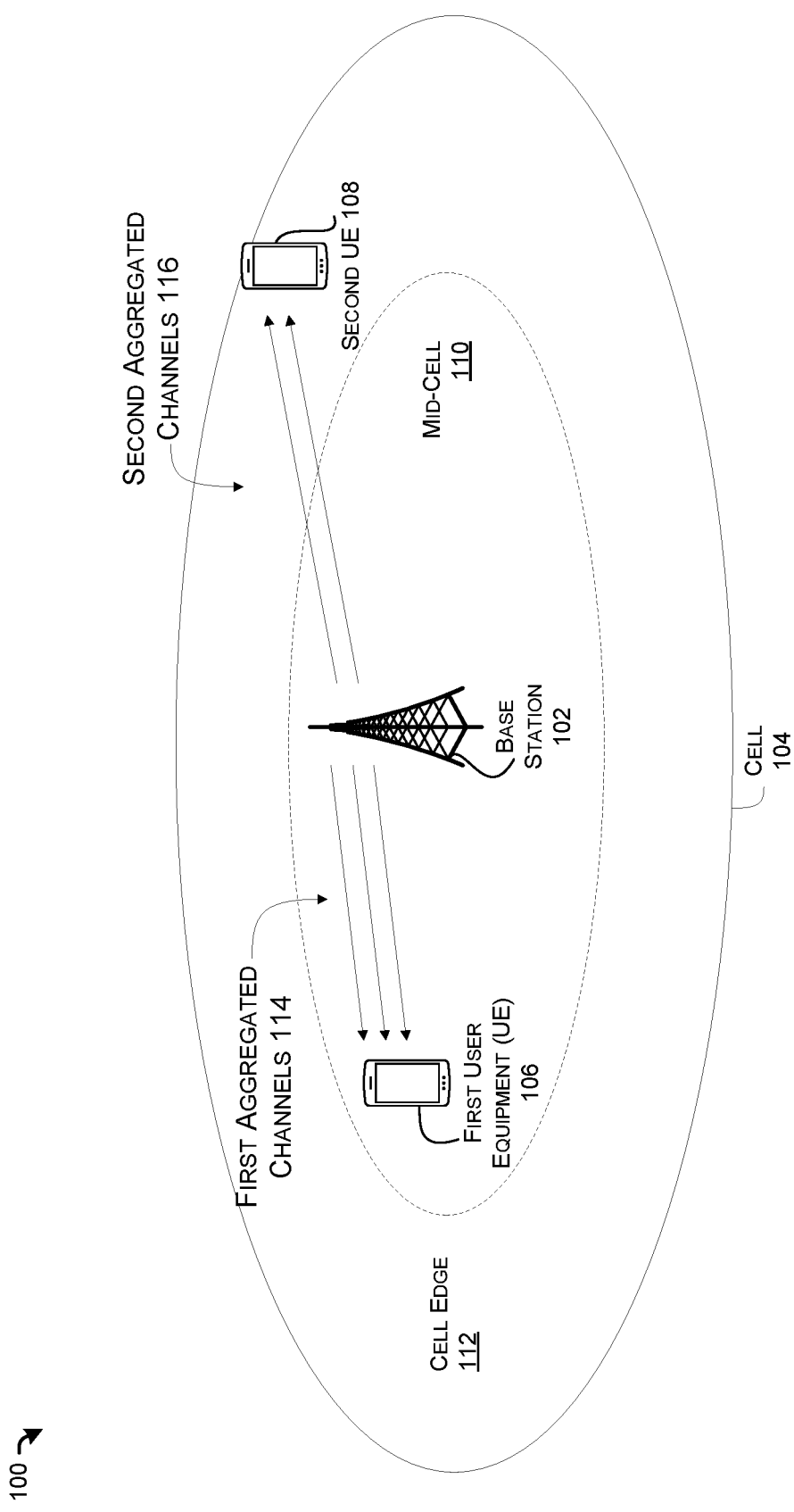
FIG. 1 illustrates an example network environment for achieving intelligent carrier aggregation in mmWave resources.

The systems, devices, and techniques described herein relate to implementing carrier aggregation in 5G radio resources. A base station, for example, intelligently assigns mmWave resources for transmission of downlink services to various devices within its coverage area based on current utilization levels of those resources, the types of services being communicated, and the like. In order to enable a device to receive communications using multiple mmWave frequency channels, the base station sends a request to the device that causes the device to activate appropriate antennae for mmWave communications. Once the antennae are activated, the base station is able to transmit downlink communications to the device over multiple mmWave frequency channels, simultaneously.

In various examples, a single base station may be allocated a particular mmWave frequency spectrum, which may include multiple mmWave channels, within a certain area. For instance, the base station may be operated by a mobile carrier that has leased the mmWave frequency spectrum from a governmental entity with jurisdiction in the area, such as the U.S. Federal Communications Commission (FCC). At times, the base station may utilize a portion of the allocated mmWave frequency spectrum to transmit data to devices located within the certain area. However, in some cases, a portion of the spectrum may remain idle and unused.

In some implementations described herein, the base station may be able to enhance the user experience associated with a particular device if the base station is able to aggregate multiple portions of the mmWave frequency spectrum for transmission to the particular device. Because the mmWave frequency spectrum allocated to the base station is limited, however, the base station must limit or otherwise prioritize what portions of the mmWave frequency spectrum are utilized for the particular device, and what portions of the spectrum should be reserved for the other devices. Further, in many cases, the particular device includes independent receiver antennae that correspond, respectively, to different portions of the mmWave frequency spectrum. To conserve (e.g., battery) resources of the particular device, the particular device may refrain from activating the antennae that the device can use to receive data over the different portions of the mmWave frequency spectrum.

According to various implementations of the present disclosure, mmWave frequency spectrum is intelligently allocated to devices within a coverage area, thereby minimizing idle spectrum and thus increasing spectral efficiency. In some cases, channels within the mmWave frequency spectrum are aggregated for downlink transmissions to individual devices based on availability, such as real-time congestion levels of the channels. In some cases, the channels are selectively aggregated for prioritized data traffic, such as guaranteed bit rate (GBR) data traffic, ultra-reliable low latency communication (URLLC) data traffic, and the like. According to various examples, channels are aggregated for downlink traffic to an individual device based on conditions of the device itself, such as its battery level. In some examples, a machine learning model is used to intelligently allocate the mmWave spectrum to devices within the coverage area.

In various examples, upon selecting one or more downlink channels for a particular device in the coverage area, the base station may cause the particular device to engage one or more antennae that the particular device can use to utilize the downlink channel(s). For instance, the base station may transmit, to the particular device, a request to supply power to the appropriate antenna(e). Once the device has activated the appropriate antenna(e), the device is configured to receive the data over the downlink channel(s).

Various implementations described herein represent practical applications in the technical field of telecommunications networks. For example, examples described herein provide an improvement to telecommunications networks (and users) by enabling a device to receive data over multiple mmWave channels, thereby increasing downlink data throughput in 5G networks. Furthermore, various examples illustrate techniques for adaptive carrier aggregation of mmWave frequency spectrum based on real-time conditions of the network, of the device, and of the sensitivity of the services being supplied to the device to delays. The intelligent carrier aggregation techniques described herein can reduce idle spectrum without negatively impacting (—while e.g., maintaining or improving) user experience. Accordingly, the techniques described herein achieve a technological solution to a technological problem specific to telecommunications networks.

Various implementations of the present disclosure will now be described with reference to the accompanying figures.

FIG. 1 illustrates an example network environment 100 for achieving intelligent carrier aggregation in mmWave resources. In the network environment 100, a base station 102 can communicate with any of a variety of devices in a cell 104, such as a first user equipment (UE) 106 and a second UE 108.

In various embodiments, the base station 102 may include at least one device configured to schedule wireless resources for uplink and downlink communications within the cell 104. The base station 102 may further include at least one device configured to transmit communications over the wireless resources to devices located in the cell 104 (e.g., the first UE 106 and the second UE 108), and to receive communications over the wireless resources from the devices located in the cell 104.

Although not illustrated in FIG. 1, in some instances, the base station 102 may relay communications between an external network (e.g., a core network) and the devices located in the cell 104. A core network, for example, can provide services to device(s) via the base station 102 from a wide area network (WAN), such as the Internet. In some instances, the core network includes an IP Multimedia Subsystem (IMS) core (sometimes referred to as an "IMS core network," an "IMS network," or an "IM CN Subsystem"). IMS is an architectural framework defined by 3GPP for delivering Internet Protocol (IP) multimedia to a device, such as the first UE 106 and the second UE 108. The IMS core can be maintained and/or operated by one or more service providers that provide IMS-based services to a user who is associated with the device. For example, a service provider can offer multimedia telephony services that allow a user to call or message other users via the IMS core using his/her device. A user can also utilize an associated device to receive, provide, or otherwise interact with various different IMS-based services by accessing the IMS core. It is to be appreciated that any number of base stations, such as base station 102, and/or IMS nodes can be associated with the IMS network.

An operator of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device may be configured to request establishment of a communication session. In the case of telephony services, the communication session can comprise a call (e.g., a voice-based communication session, such as a Voice Over LTE (VoLTE) call, or a Wi-Fi call).

In some instances, the base station 102 can utilize wireless resources specified in the 5G New Radio (NR) standard, as defined by 3GPP. In certain implementations, the base station 102 can transmit and receive communications over frequency resources including mmWave bands including, but not limited to 24 GHz, 28 GHz, 39 GHz, 60 GHz, and the like. In some embodiments, the base station 102 can be, or at least include, a gNodeB.

In addition, the base station 102 may utilize other types of wireless resources. For example, the base station 102 may utilize a wireless band including frequency resources in at least one of a Citizens Broadband Radio Service (CBRS) band (e.g., a 3550-3700 MHz band, such as LTE Band 48), a Long Term Evolution (LTE) Band 71 (e.g., a 600 MHz band), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the base station may utilize the frequency resources discussed herein in the context of any 5G embodiments.

In some embodiments, the base station 102 is part of a Non-Standalone (NSA) architecture and/or a Standalone (SA) architecture. In an NSA architecture, the base station 102 may be coordinated with an LTE base station, and/or may relay services between devices in the cell 104 and an LTE core network (e.g., an Evolved Packet Core (EPC)). In an SA architecture, the base station 102 may relay services between devices in the cell 104 and a 5G core network (5GC).

The cell 104 may be a geographic region in which the base station 102 can transmit and/or receive wireless communications. The cell 104 may be divided into at least two regions, which are defined according to a distance from the base station 102, a quality of wireless communications with the base station 102, sources of attenuation in the cell 104, etc. For example, the cell 104 may include a mid- or near-cell region 110 and a cell edge region 112. In some instances, the mid-cell region 110 is less than a threshold distance from the base station 102 and is a region where wireless communication with the base station 102 is relatively strong. In certain instances, the cell edge region 112 is more than a threshold distance from the base station 102 and has an outer boundary that is defined by an outer boundary of the cell 104. In some instances, the cell edge region 112 is a region where wireless communication with the base station 102 is weaker than in the mid-cell region 110. The base station 102 may determine whether devices are located in the mid-cell region 110 or the cell edge region 112 based on a quality and/or power of transmissions between the base station 102 and the devices. For instance, the base station 102 may determine that the first UE 106 is located in the mid-cell region 110 by receiving a signal from the first UE 106 and determining that a quality or power of the received signal is greater than a particular threshold. The base station 102 may determine that the second UE 108 is located in the cell edge region 112 by receiving a signal from the second UE 108 and determining that a quality or power of the received signal is less than or equal to the particular threshold.

The first UE 106 and the second UE 108 are configured to transmit and/or receive wireless communications with the base station 102 and may be located in the cell 104. The first UE 106, the second UE 108, or both, may be capable of supporting NR communications. For example, the first UE 106 and the second UE 108 may be configured to support at least one of enhanced Mobile Broadband (eMBB) communications, Ultra Reliable Low Latency Communications (URLLCs), or massive Machine Type Communications (mMTCs). In some instances, the first UE 106 and/or the second UE 106 support one or more of a sensor network, voice services, smart city cameras, gigabytes-in-a-second communications, 3D video, 4K screens, work & play in the cloud, augmented reality, industrial and/or vehicular automation, mission critical broadband, or a self-driving car.

The first UE 106 and the second UE 108 are capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), NR, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of the first UE 106 and the second UE 108 can include, but are not limited to, smart phones, mobile phones, cell phones, tablet computers, portable computers, laptop computers, personal digital assistants (PDAs), electronic book devices, or any other electronic devices (e.g., portable and/or stationary devices) that can generate, request, receive, transmit, or exchange voice, video, and/or digital data over a network. Additional examples of the first UE 106 and the second UE 108 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a wireless network.

The base station 102 may be configured to transmit first downlink data to the first UE 106. As used herein, the term "downlink," and its equivalents, refers to a transmission direction defined from a base station to an end-user device. As used herein, the term "uplink," and its equivalents, refers to a transmission defined from the end-user device to the base station. The base station 102 may utilize multiple channels for downlink transmissions within the cell 104. As used herein, the terms "channel," "frequency channel," "frequency resource," "carrier frequency," or their equivalents, may refer to a distinct range of electromagnetic frequencies or spectrum by which data can be transmitted wirelessly from one device to at least one other device. A "band" may refer to a range of frequencies including multiple channels that are adjacent in the frequency spectrum. In some examples, a frequency channel is defined according to a single frequency. For instance, the data is transmitted by modulating a "carrier," which is an electromagnetic wave that has a frequency defined within a particular frequency channel. The base station 102 may utilize various channels in the radio spectrum. In particular, the base station 102 may be allocated, or otherwise utilize, multiple mmWave channels for downlink transmission within the cell 104. For example, the base station 102 may utilize multiple channels in the 24 to 300 GHz range.

In various implementations, the base station 102 may select at least one of the mmWave channels to transmit the first downlink data to the first UE 106. When the base station 102 utilizes multiple channels, simultaneously, to transmit data to a device within the cell, the base station 102 may be referred to a "aggregating" the channels. The term "carrier aggregation," and its equivalents, refers to utilizing carriers in multiple frequency channels to receive or transmit data simultaneously from a single device. By aggregating the channels, the total radio bandwidth and thus data throughput to or from the device can be increased. The term "inter-band aggregation" refers to the aggregation of channels in different bands. The term "intra-band aggregation" refers to the aggregation of channels in the same band. Aggregated channels that are adjacent in the frequency spectrum are referred to as "contiguous," whereas aggregated channels that are non-adjacent (e.g., there is a separation or space in the electromagnetic frequency spectrum between the channels) are referred to as "non-contiguous." In the example of FIG. 1, the base station 102 may select first aggregated channels 114 over which to transmit the first downlink data to the first UE 106. The first aggregated channels 114, in various examples, include multiple mmWave channels. The multiple mmWave channels may be in different bands, in the same band, contiguous, non-contiguous, or a combination thereof.

The base station 102 may select the first aggregated channels 114 based on various conditions of the first UE 106. For example, the first UE 106 may indicate, to the base station 102, what channels the first UE 106 is configured to utilize. For example, the first UE 106 may include a finite number of antennae configured to receive data via a particular set of frequency channels and may lack antennae that would otherwise enable the first UE 106 to receive data via another set of frequency channels. The base station 102 may select the first aggregated channels 114 among the frequency channels that the first UE 106 is configured to utilize.

In various examples, the base station 102 may select the first aggregated channels 114 based on a battery level of the first UE 106. The first UE 106, for instance, may report its battery level to the base station 102. The first UE 106 may supply power, from its battery, to activate the antennae configured to receive data via the first aggregated channels 114. The first UE 106 may extract charge from its battery at a rate that is positively correlated with the number of activated antennae in the first UE 106. In some cases, the base station 102 may limit the number of the first aggregated channels 114 to conserve the battery level of the first UE 106. For example, the base station 102 may limit the number of the first aggregated channels 114 to no more than a certain number (e.g., two) if the battery level of the first UE 106 is below a particular threshold. In some cases, the base station 102 may refrain from using channel aggregation for transmission of the first downlink data if the battery level of the first UE 106 is below a certain threshold.

In some cases, the base station 102 may select the first aggregated channels 114 based on a position of the first UE 106 within the cell 104. The distance between the base station 102 and the first UE 106 may impact the reliability of data transmitted over mmWave channels, in particular, because mmWave signals are attenuated by the air and obstructions to a greater extent than lower-frequency signals, such as signals transmitted over LTE bands. The base station 102 may prioritize devices within the mid-cell region 110 over devices within the cell edge region 112 for mmWave channel allocation. In some examples, the base station 102 may determine that the first UE 106 is in the mid-cell region 110 based on a quality of signal received by the base station 102 from the first UE 106. In the example of FIG. 1, the base station 102 may select a greater number of the first aggregated channels 114 for the first UE 106 in the mid-cell region 110, than the base station 102 would have selected if the first UE 106 was in the cell edge region 112.

In some implementations, the base station 102 may select the first aggregated channels 114 based on a service type of the first downlink data. For example, the base station 102 may determine whether the first downlink data includes prioritized data. In some instances, QoS Class Identifiers (QCIs) can be used to categorize different types of services traversing the base station 102. In 5G networks, a QCI may be referred to as a 5G QoS Identifier (5QI). Each QCI (e.g., each 5QI) may be associated with at least one of a service type, a priority, a Packet Error Rate (PER), or a Packet Delay Budget (PDB). A service type may refer to the type of services associated with the QCI. Some example service types with QCIs (e.g., designated by LTE) include conversational voice (QCI 1), conversational video (live streaming) (QCI 2), real time gaming and V2X messages (QCI 3), non-conversational video (buffered streaming) (QCI 4), IMS signaling (QCI 5), video (buffered streaming) TCP-based (QCI 6), and voice/video (live streaming)/interactive gaming (QCI 7). Various 5QIs have been designated for various types of services that can be delivered by 5G networks.

A PER (also referred to as a "packet error loss rate") of a QCI may correspond to the maximum number of data packets (of a corresponding service type) that can be unsuccessfully delivered via one or more delivery networks over the total number of data packets (of the corresponding service type) that are transmitted through the delivery network(s). The PER of the QCI may correspond to the sensitivity of the QoS of the corresponding services to packet errors and/or loss. For instance, a PER of a QCI associated with conversational voice services may be $10^{-2}$, whereas a PER of a QCI associated with IMS signaling services may be $10^{-6}$. In this instance, even though the voice services are more sensitive to delays than the IMS signaling services, the IMS signaling services are more sensitive to error loss than the voice services.

A PDB can refer to a maximum delay or latency that a data packet associated with the corresponding services can experience through the delivery network(s) without noticeably affecting QoS. A QCI associated with V2X messages, for example, may have a PDB of 50 milliseconds (ms), whereas a QCI associated with video (buffered streaming) TCP-based may have a PDB of 300 ms.

Some QCI levels may be associated with a GBR. A GBR can refer to a minimum bit rate at which the corresponding types of services are to be delivered through the delivery network(s). Service types associated with QCIs that have GBRs may be referred to as "GBR services," and service types with QCIs that lack GBRs may be referred to as "non-GBR services." In some cases, a GBR of a QCI can be defined according to the QCI's PER and/or PDB.

According to various implementations, prioritized services may be defined as having any service type with a QCI associated with at least one of a priority that is above a threshold priority level, a PER lower than a threshold PER, a PDB that is lower than a threshold PDB, or a GBR. In some implementations, prioritized services may be defined as any services with one of a predetermined set of QCIs (e.g., 5QIs). Examples of prioritized data include data associated prioritized services, such as with GBR services, URLLC services, services with particular QCIs, services associated with greater than a threshold 5QI, services with a particular priority level, services with lower than a threshold PDB, services with lower than a particular PER, and the like. Data that is not prioritized data may be referred to as "non-prioritized data." The base station 102 may increase the number of the first aggregated channels 114 if the first downlink data is prioritized data and may decrease the number of the first aggregated channels 114 if the first downlink data is non-prioritized data.

According to various examples, the base station 102 may select the first aggregated channels 114 based on network conditions. For example, the base station 102 may determine respective congestion levels of the multiple mmWave channels available for downlink transmission. As used herein, the terms "congestion level," "utilization level," and their equivalents, can refer to an amount of a wireless resource being utilized to transfer data between devices. For example, the congestion level of a wireless channel can refer to an amount (e.g., a percentage) of scheduled slots or resources within the wireless channel. The base station 102 may select the first aggregated channels 114 among mmWave channels that would otherwise remain idle or unused. For example, the base station 102 may select the first aggregated channels 114 among mmWave channels with less than a threshold congestion level.

In various cases, the base station 102 may modify the first aggregated channels 114 based on changing conditions of the device and/or network. For example, if the base station 102 determines that the battery level of the first UE 106 has fallen below a threshold, the base station 102 may reduce the number of the first aggregated channels 114. In some cases, if the first UE 106 switches from prioritized services (e.g., GBR services) to non-prioritized services (e.g., non-GBR services), the base station 102 may reduce the number of the first aggregated channels 114. In some examples, the base station 102 may subtract any channel among the first aggregated channels 114 with a congestion level that exceeds a threshold or may add additional channels to the first aggregated channels 114 when they become available. Thus, the base station 102 may reduce the amount of idle spectrum while also maintaining and/or improving user experience for devices within the cell 104.

In some examples, the base station 102 may utilize a computing model to predict conditions of the network and adjust the first aggregated channels 114 based on the predicted conditions. The base station 102 may store congestion levels of various channels within the spectrum over time. The base station 102 may use a computing model, such as a machine learning model and or Artificial Intelligence (AI), to identify trends in the congestion levels. As used herein, the term "machine learning model" can refer to any computing model that is built or otherwise optimized based on training data. The machine learning model, for example, may be configured to identify features that are indicative of data traffic and/or spectrum trends based on training data indicating previous data traffic metrics associated with the base station 102. The machine learning model may be supervised, unsupervised, or a combination of both. Examples of the machine learning model include at least one of a decision tree, a support vector machine, a regression model (e.g., a logistic regression model), a Bayesian network, or any other type of machine learning model known in the art. Once trained, the machine learning model may be configured to intelligently select and/or adjust the first aggregated channels 114 in order to maximize resource utilization among all of the channels allocated to the base station 102 within the cell 104.

In a particular example, the base station 102 may be located at a train station. The base station 102 may identify, by training the machine learning model, that one or more times of the day are regularly associated with high congestion levels in the spectrum utilized by the base station 102. For instance, the time(s) may be correlated with commuter train arrival times within the train station. Using the machine learning model, the base station 102 may predict that congestion levels will temporarily increase at an expected arrival time of a train on a particular day. In some cases, the base station 102 may reduce the number of the first aggregated channels 114 within a particular time period (e.g., 15 minutes) of the expected arrival time of the train.

The base station 102 may be configured to predict network conditions within the cell 104 using other techniques. For instance, the base station 102 may identify a rate-of-change of a congestion level of a particular channel. The base station 102 may selectively allocate the particular channel to the first aggregated channels 114 based on the rate-of-change of the congestion level. For example, if the particular channel is under, but near a threshold congestion level (e.g., 80%), the base station 102 may add the particular channel to the first aggregated channels 114 if the congestion level is decreasing but may refrain from adding the particular channel to the first aggregated channels 114 if the congestion level is increasing.

The base station 102 may also select second aggregated channels 116 over which to transmit second downlink data to the second UE 108. The second aggregated channels 116 may include mmWave channels but may be different than the first aggregated channels 114. For instance, there may be fewer of the second aggregated channels 116 than the first aggregated channels based on the second UE 108 having a lower battery level than the first UE 106, the presence of the second UE 108 in the cell edge region 112, the second UE 108 receiving less prioritized downlink services than the first UE 106, congestion within the spectrum, or any combination thereof.

Figure 2:
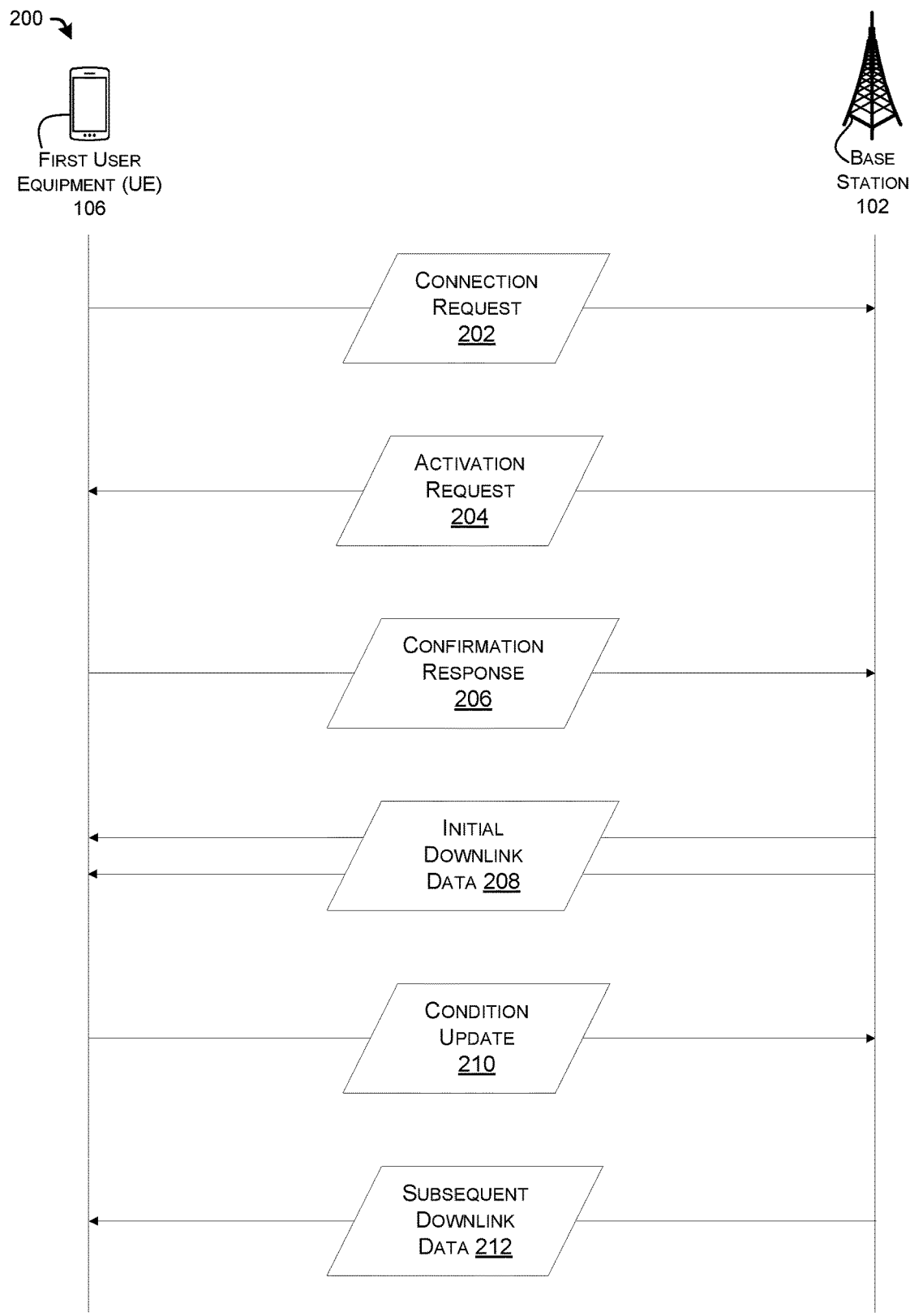
FIG. 2 illustrates example signaling between a device and a RAN.

FIG. 2 illustrates example signaling 200 between a device and a RAN, such as the first UE 106 and the base station 102 described above with reference to FIG. 1. The signaling 200 can enable the base station 102 to select, based on conditions of the first UE 106 and/or the network, multiple downlink mmWave channels for the first UE 106 and to transmit downlink data to the first UE 106 via the mmWave channels. Various messages within the signaling 200 may include data packets or segments encoded into radio transmissions, in various cases.

The first UE 106 may transmit a connection request 202 to the base station 102. The connection request 202 may be a request for downlink services. In various implementations, the connection request 202 may indicate capabilities of the first UE 106. The connection request 202, for example, may indicate that the first UE 106 is capable of receiving data wirelessly via mmWave channels, what mmWave channels over which the first UE 106 can receive data, or the like. In some cases, the connection request 202 may further indicate a status of the first UE 106. For example, the connection request 202 may indicate a battery level (e.g., a percentage of the total capacity of the battery that is charged, an amount of charge in the battery, etc.) of the first UE 106. According to some examples, the base station 102 may determine whether the first UE 106 is in a mid-cell region or a cell edge region of the base station 102 based on the connection request 202. For instance, the connection request 202 may indicate a position based on Global Positioning Service (GPS) or alternative technology of the first UE 106 that the base station 102 may identify as being within the mid-cell region or the cell edge region. In some cases, the base station 102 can determine whether the first UE 106 is in the mid-cell region or the cell edge region based on a signal strength and/or a quality of the connection request 202 as-received by the base station 102 or other radio measurement technologies.

In various implementations, the base station 102 may select multiple mmWave channels over which to transmit downlink data to the first UE 106. For example, the base station 102 may select the mmWave channels among mmWave channels that the first UE 106 is capable of utilizing, as indicated in the connection request 202. In some cases, the base station 102 may select the mmWave channels based on the status of the first UE 106. For instance, the base station 102 may select a relatively large number of the mmWave channels if the battery level is greater than or equal to a threshold and may select a relatively small number of the mmWave channels if the battery level is less than the threshold. The base station 102 may select the mmWave channels based on a service type of the downlink services requested in the connection request 202. For example, the base station 102 may select a relatively large number of the mmWave channels if the downlink services are prioritized services (e.g., GBR services, URLLC services, services associated with greater than a threshold 5G 5QI, services with a particular priority level, services with lower than a threshold PDB, or services with lower than a particular PER) and may select a relatively small number of the mmWave channels if the downlink services are non-prioritized services (e.g., non-GBR services, non-URLLC services, services with less than or equal to the threshold 5QI, services without the particular priority level, services with greater than or equal to the threshold PDB, or services with greater than or equal to the particular PER). According to various implementations, the base station 102 may select a relatively large number of the mmWave channels if the first UE 106 is located in the mid-cell region and a relatively small number of the mmWave channels if the first UE 106 is located in the cell edge region. In some examples, the base station 102 may select one or more relatively high frequency mmWave channels (e.g., one or more channels in the 39 GHz band) if the first UE 106 is located in the mid-cell region and reserve one or more relatively low frequency mmWave channels (e.g., one or more channels in the 24 GHz band) if the first UE 106 is located in the cell edge region. In some implementations, the base station 102 may select the mmWave channels based on one or more network conditions. For example, the base station 102 can select the mmWave channels among mmWave channels allocated to the base station 102 that have less than a threshold congestion level.

The base station 102 may transmit an activation request 204 to the first UE 106. The activation request 204 may specify the selected mmWave channels and/or antennae configured to receive the downlink data via the selected mmWave channels. Based on the activation request 204, the first UE 106 may activate the antennae. For example, the first UE 106 may connect the battery to the antennae.

Once the antenna are activated, the first UE 106 may transmit a confirmation response 206 to the base station 102. The confirmation response 206 may indicate, to the base station 102, that the first UE 106 is ready to receive the downlink data via the selected mmWave channels.

Based on the confirmation response 206, the base station 102 may transmit initial downlink data 208 to the first UE 106. The base station 102, for instance, may transmit the initial downlink data 208 over the selected mmWave channels. That is, the base station may practice carrier aggregation to transmit the downlink data 208 simultaneously over the selected mmWave channels.

Optionally, the first UE 106 may transmit a condition update 210 to the base station 102. The condition update 210 may indicate that the condition of the first UE 106 has changed. For example, the condition update 210 may indicate that the battery level of the first UE 106 has fallen below the threshold. According to some instances, the condition update 210 may indicate that the first UE 106 has moved to the cell edge region of the base station 102. In some cases, the first UE 106 may automatically deactivate one or more of the antennae and indicated the deactivated antenna(e) and/or the mmWave channels associated with the deactivated antenna(e). In some cases, the base station 102 may determine that the network conditions have changed. For instance, the base station 102 may determine that a congestion level of one or more of the mmWave channels used to transmit the initial downlink data 208 has exceeded a threshold. Although not illustrated in FIG. 2, in some implementations, the base station 102 may transmit a modification request to the first UE 106 that instructs the first UE 106 to deactivate one or more of the antennae.

Based on the condition update 212 and/or the determination the network conditions have changed, the base station 102 may transmit subsequent downlink data 214 to the first UE 106. The subsequent downlink data 212 may be transmitted over different channels than the initial downlink data 208. For instance, due to the change in the battery level of the first UE 106 and/or the network conditions, the subsequent downlink data 212 may be transmitted over fewer channels than the initial downlink data 208. Thus, the base station 102 may perform carrier aggregation dynamically over 5G radio resources.

Figure 3:
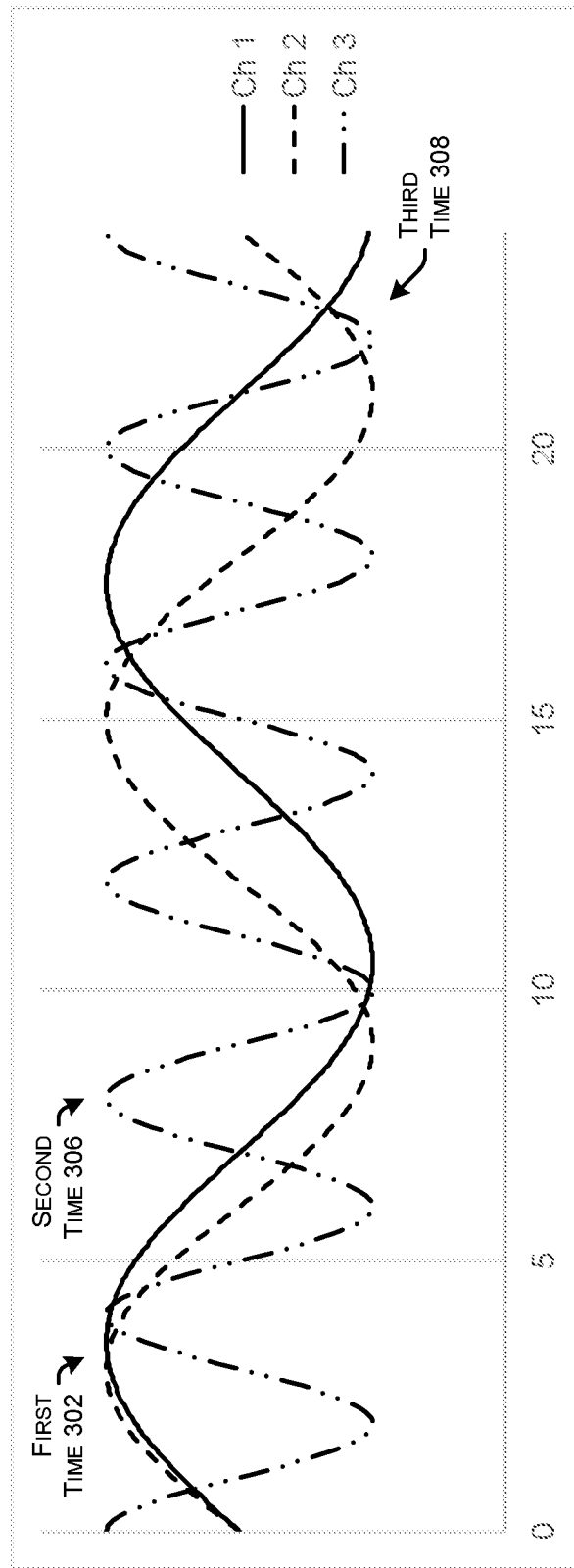
FIG. 3 is a diagram illustrating an example of changing network conditions over a 24-hour period.

FIG. 3 is a diagram 300 illustrating an example of changing network conditions over a 24-hour period. A base station, such as the base station 102 described above with reference to FIGS. 1 and 2, may perform dynamic carrier aggregation based on the changing network conditions. For example, the diagram 300 illustrates a utilization level of a first mmWave channel ("Ch 1"), a second mmWave channel ("Ch 2"), and a third mmWave channel ("Ch 3"). The first mmWave channel, the second mmWave channel, and the third mmWave channel are downlink channels, for instance.

At a first time 302, the utilization levels of the first mmWave channel, the second mmWave channel, and the third mmWave channel are relatively high. For example, the first mmWave channel, the second mmWave channel, and the third mmWave channel each have a congestion level that is greater than 80% of total capacity. Based on the high utilization levels of the first mmWave channel, the second mmWave channel, and the third mmWave channel, the base station 102 may conserve the wireless resources for prioritized services (e.g., GBR services) and may refrain from aggregating the wireless resources for non-prioritized services (e.g., non-GBR services); may conserve the wireless resources for downlink data transmitted to devices with relatively high battery levels; may conserve the wireless resources for devices located in a mid-cell region of the base station, and so on. For example, the base station 102 may select multiple mmWave channels among the first mmWave channel, the second mmWave channel, and the third mmWave channel to simultaneously deliver downlink data carrying prioritized services to a device with a battery level over a threshold and located in the mid-cell region, and may only select a single mmWave channel among the first mmWave channel, the second mmWave channel, and the third mmWave channel to deliver downlink data to a device when at least one of the downlink data carries non-prioritized services, the device has a battery level less than or equal to the threshold, or the device is located in the cell-edge region of the base station.

At a second time 306, the utilization levels of the first mmWave channel and the second mmWave channel are relatively low, and the utilization level of the third mmWave channel is relatively high. For example, the first mmWave channel and the second mmWave channel each have utilization levels that are less than 20% of total capacity, and the third mmWave channel has a congestion level that is greater than 80% of total capacity. Based on the relatively low utilization levels of the first mmWave channel and the second mmWave channel, the base station may be more likely to aggregate the first mmWave channel and the second mmWave channel at the second time 306 than at the first time 302. For example, the base station may select multiple mmWave channels including the first mmWave channel and/or the second mmWave channel to deliver non-prioritized services and/or to devices located in the cell edge-region at the second time 306. In some examples, the base station may only aggregate the relatively congested third mmWave channel for prioritized services and/or devices located in the mid-cell region.

At the third time 308, the base station may even be more aggressive with aggregating the first mmWave channel, the second mmWave channel, and the third mmWave channel than the second time 306. For example, the utilization levels of the first mmWave channel, the second mmWave channel, and the third mmWave channel are each less than 20% at the third time 308. Thus, at the third time 308, the base station may aggregate multiple mmWave channels among the first mmWave channel, the second mmWave channel, and the third mmWave channel for downlink data transmitted to devices with relatively low battery levels, devices located in the cell edge region, when the downlink data includes non-prioritized services, or the like. Accordingly, the base station may reduce the percentage of idle capacity in the first mmWave channel, the second mmWave channel, and the third mmWave channel.

In some implementations, the base station may allocate resources of the first mmWave channel, the second mmWave channel, and the third mmWave channel by predicting the utilization levels of the first mmWave channel, the second mmWave channel, and the third mmWave channel. For example, the base station may determine that the third mmWave channel peaks at the second time 306 each day, but that the utilization level of the third mmWave channel drops precipitously after the second time 306 each day. In an example day, the base station may allocate a portion of the third mmWave channel to downlink data to a device at the second time 306, even when the utilization level is quite high, because of the predicted drop off in utilization.

In some cases, the base station may allocate resources of the first mmWave channel, the second mmWave channel, and the third mmWave channel based on rates-of-change of the utilization levels. For example, although the third mmWave channel has lower than 20% utilization at the third time 308, the rate of change of the utilization level is positive, and the base station may refrain from allocating the third mmWave channel to some types of downlink transmissions and/or to some devices.

Figure 4:
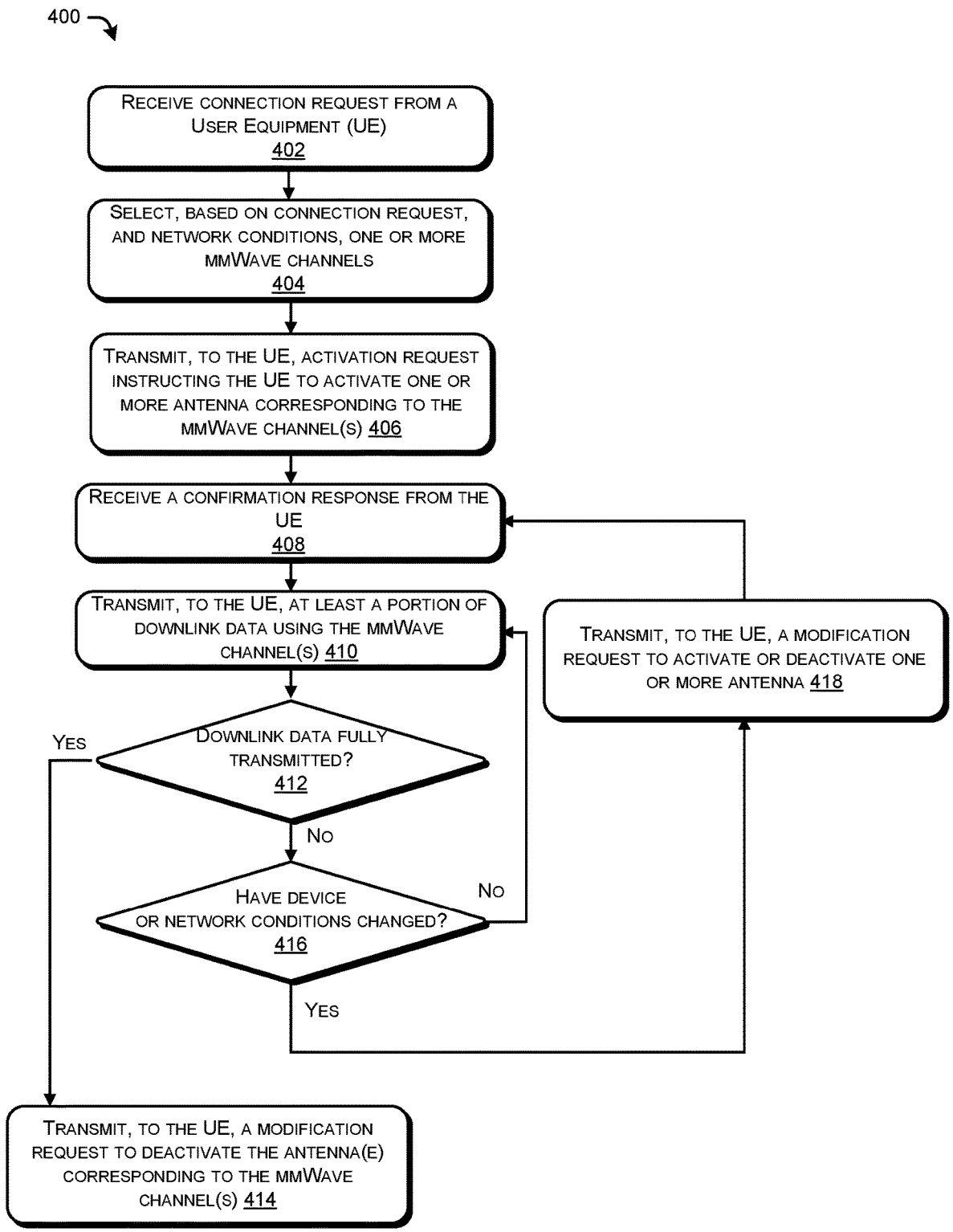
FIG. 4 illustrates an example method for intelligent carrier aggregation of mmWave resources.

FIG. 4 illustrates an example method 400 for intelligent carrier aggregation of mmWave resources. In some implementations, the method 400 is performed by an entity such as the base station 102 described above with reference to FIGS. 1 and 2. Although the method 400 includes various elements illustrated in a particular order, implementations of the present disclosure are not limited to the particular order illustrated in FIG. 4.

At 402, the entity receives a connection request from a UE. The connection request may indicate one or more conditions of the UE and/or a type of downlink services to be delivered to the UE. For example, the entity may determine, based on the connection request, that the UE is requesting prioritized data or non-prioritized data. In some examples, the entity may determine, based on the connection request, that the UE is located in a mid-cell region or a cell edge region of the entity. For instance, the connection request may include data indicating a location of the UE that is within the mid-cell region or the cell edge region, or the entity may determine that the UE is in the mid-cell region or the cell edge region based on a quality or signal strength of the connection request. In some implementations, the connection request may further indicate a capability of the UE, such as one or more antenna(e) within the UE that enable the UE to receive wireless signals over at least one downlink mmWave channel or band. In some cases, the connection request may indicate a battery level of the UE. In various examples, the connection request may be transmitted over a mmWave resource or a non-mmWave resource.

At 404, the entity selects, based on the connection request and network conditions, one or more mmWave channels. Several mmWave channels may be allocated to the entity within a particular cell region. According to some implementations, the entity may select at least a subset of the mmWave channels for the UE based on the type of downlink services, the location of the UE, the capability of the UE, the battery level of the UE, or a combination thereof. For example, the entity may select n mmWave channels for the UE if type of downlink services are prioritized services or may select m mmWave channels for the UE if the type of downlink services are non-prioritized services, wherein n and m are positive integers and n>m. In some cases, the entity may select o mmWave channels for the UE if the location of the UE is within the mid-cell region and may select p mmWave channels for the UE if the location of the UE is within the cell edge region, wherein o and p are positive integers and o>p. The entity may select the mmWave channel(s) for the UE among mmWave channels tuned to the antenna(e) included in the UE. For example, the entity may select one or more relatively high frequency mmWave channels (e.g., one or more channels in the 39 GHz band) when the UE is determined to be located in the mid-cell region and reserve one or more relatively low frequency mmWave channels (e.g., one or more channels in the 24 GHz band) when the UE is determined to be located in the cell edge region. In various examples, the entity may select q mmWave channels for the UE if the battery level of the UE is above a certain threshold (e.g., 50%, 60%, 70%, 80%, 90%, etc.) and may select r mmWave channels for the UE if the battery level of the UE is less than or equal to the certain threshold, wherein q and r are positive integers and q>r.

In some examples, the entity may determine congestion and/or utilization levels of the multiple mmWave channels allocated to the entity within a particular cell region. The mmWave channels may be in the same band or multiple bands. Based on the congestion and/or utilization levels, the entity may select the mmWave channel(s) to transmit downlink data to the UE. For example, the entity may select the mmWave channel(s) for the UE among mmWave channels with congestion levels that are below a particular threshold (e.g., 50%, 60%, 70%, 80%, 90%, etc.). In some cases, the entity selects the particular threshold based on device conditions and/or the type of downlink services. For instance, the entity may select a threshold s if the downlink services are prioritized services and/or the device is located within the mid-cell region and a threshold t if the downlink services are non-prioritized services and/or the device is located within the cell-edge region, wherein s and t are percentages greater than or equal to 0% and less than 100% and s>t.

At 406, the entity transmits, to the UE, an activation request instructing the UE to activate one or more antennae corresponding to the mmWave channel(s). For example, the activation request may include data indicating the instruction. As a result, the UE may connect the antenna(e) to a power source, such a battery within the UE. At 408, the entity receives a confirmation response from the UE. The confirmation response may indicate that the UE has activated the antenna(e) and is ready to receive downlink data transmitted over the selected mmWave channel(s).

At 410, the entity transmits, to the UE, at least a portion of downlink data using the selected mmWave channel(s). In various examples, the entity transmits the downlink data over multiple, aggregated mmWave channels. That is, the entity uses carrier aggregation to transmit the portion of the downlink data.

At 412, the entity determines whether the downlink data has been fully transmitted. If the downlink data has been fully transmitted, then the process 400 proceeds to 414. At 414, the entity transmits, to the UE, a request to deactivate the antenna(e) corresponding to the mmWave channel(s). In response, the UE may disconnect the antenna(e) from the battery.

If, on the other hand, the downlink data has not been fully transmitted, then the process 400 proceeds to 416. At 416, the entity determines whether the device or network conditions have changed. If the entity determines that the device or network conditions are unchanged, the process 400 returns to 410.

However, if the entity determines that the device or network conditions have changed, the process proceeds to 418. Optionally, the entity may receive a condition update from the device that indicates that the conditions of the device have changed, such as the UE has moved between the mid-cell region and the cell edge region and/or that the battery level of the UE has fallen below the certain threshold. In some cases, the entity may determine that the utilization and/or congestion levels of the mmWave channels allocated to the entity have changed. At 418, the entity transmits, to the UE, a modification request to activate or deactivate one or more antenna(e). The UE may activate or deactivate one or more antennae based on the modification request. After performing 418, the entity returns to performing 408 and receives a confirmation response based on the modification request. Thus, the entity may adjust the number and type of aggregated mmWave channels over which to deliver the downlink data to the UE based on real-time conditions of the device and/or network.

FIG. 5 illustrates an example of a system 500 that includes a first device 502 configured to deliver downlink data to a second device 504. The first device 502 may be at least a part of the base station 102 described above with reference to FIGS. 1 and 2. The second device 504 may be the first UE 106 or the second UE 108 described above with reference to FIGS. 1 and 2.

The first device 502 includes any of memory 506, processor(s) 508, removable storage 510, non-removable storage 512 input device(s) 514, output device(s) 516, and transceiver(s) 518. The memory 506 may include component(s) 520. The component(s) 520 may include at least one of instruction(s), program(s), database(s), software, operating system(s), etc. In some implementations, the component(s) 520 include instructions that are executed by processor(s) 508 and/or other components of the first device 502. The memory 506 may further include a resource allocator 522, which, when executed by the processor(s) 508, cause the first device 502 to select downlink mmWave resources for carrier aggregation and/or any other functionality described herein. In some embodiments, the processor(s) 508 include a central processing unit (CPU), a graphics processing unit (GPU), or both CPU and GPU, or other processing unit or component known in the art.

The first device 502 may also include additional data storage devices (removable and/or non-removable) such as, for example, magnetic disks, optical disks, or tape. Such additional storage is illustrated in FIG. 5 by removable storage 510 and non-removable storage 512. Tangible computer-readable media can include volatile and non-volatile, removable and non-removable media implemented in any method or technology for storage of information, such as computer readable instructions, data structures, program modules, or other data. The memory 506, the removable storage 510, and the non-removable storage 512 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the first device 502. Any such tangible computer-readable media can be part of the first device 502.

The first device 502 may be configured to communicate over a telecommunications network using any common wireless and/or wired network access technology. Moreover, the first device 502 may be configured to run any compatible device Operating System (OS), including but not limited to, Microsoft Windows Mobile, Google Android, Apple iOS, Linux Mobile, as well as any other common mobile device OS.

The first device also can include input device(s) 514, such as a keypad, a cursor control, a touch-sensitive display, voice input device, etc., and output device(s) 516 such as a display, speakers, printers, etc. These devices are well known in the art and need not be discussed at length here.

As illustrated in FIG. 5, the first device 502 also includes one or more wired or wireless transceiver(s) 518. For example, the transceiver(s) 518 can include a network interface card (NIC), a network adapter, a Local Area Network (LAN) adapter, or a physical, virtual, or logical address to connect to various network components, for example. To increase throughput when exchanging wireless data, the transceiver(s) 516 can utilize multiple-input/multiple-output (MIMO) technology. The transceiver(s) 518 can comprise any sort of wireless transceivers capable of engaging in wireless, radio frequency (RF) communication. The transceiver(s) 518 can also include other wireless modems, such as a modem for engaging in Wi-Fi, WiMAX, BLUETOOTH®, infrared communication, and the like. The transceiver(s) 518 may include transmitter(s), receiver(s), or both. In various implementations, the transceiver(s) 518 include one or more transmitters configured to transmit data wirelessly over one or more mmWave channels to the second device 504.

The second device 504 includes any of memory 524, processor(s) 526, removable storage 528, non-removable storage 530, input device(s) 532, output device(s) 534, transceiver(s) 536, and a battery 538 configured to power various elements of the second device 504. The memory 524 may include component(s) 540. The component(s) 540 may include at least one of instruction(s), program(s), database(s), software, operating system(s), etc. In some implementations, the component(s) 538 include instructions that are executed by processor(s) 526 and/or other elements of the second device 504. The memory 524 may further include a reporter 542, which, when executed by the processor(s) 508, causes the second device 504 to report a condition (e.g., a charge level of the battery 538) to the first device 502 and/or any other functionality described herein. In some cases, the memory 524 further includes an activator 544, which, when executed by the processor(s) 536, causes the second device 504 to connect the battery 538 to at least one of the transceiver(s) 536 based on an activation request from the first device 502. In some embodiments, the processor(s) 526 include a CPU, a GPU, or both CPU and GPU, or other processing unit or component known in the art.

The second device 504 may also include additional data storage devices (removable and/or non-removable) such as, for example, magnetic disks, optical disks, or tape. Such additional storage is illustrated in FIG. 5 by removable storage 528 and non-removable storage 530. Tangible computer-readable media can include volatile and non-volatile, removable and non-removable media implemented in any method or technology for storage of information, such as computer readable instructions, data structures, program modules, or other data. The memory 524, the removable storage 528, and the non-removable storage 530 are all examples of computer-readable storage media. Computer-readable storage media include, but are not limited to, RAM, ROM, EEPROM, flash memory, or other memory technology, CD-ROM, DVDs, CAM, or other optical storage, magnetic cassettes, magnetic tape, magnetic disk storage or other magnetic storage devices, or any other medium which can be used to store the desired information and which can be accessed by the second device 504. Any such tangible computer-readable media can be part of the second device 504.

The second device 504 may be configured to communicate over a telecommunications network using any common wireless and/or wired network access technology. Moreover, the second device 504 may be configured to run any compatible device OS, including but not limited to, Microsoft Windows Mobile, Google Android, Apple iOS, Linux Mobile, as well as any other common mobile device OS.

The second device 504 also can include input device(s) 532, such as a keypad, a cursor control, a touch-sensitive display, voice input device, etc., and output device(s) 534 such as a display, speakers, printers, etc. These devices are well known in the art and need not be discussed at length here.

As illustrated in FIG. 5, the second device 504 also includes one or more wired and/or wireless transceiver(s) 536. For example, the transceiver(s) 536 can include a NIC, a network adapter, a LAN adapter, or a physical, virtual, or logical address to connect to various network components, for example. To increase throughput when exchanging wireless data, the transceiver(s) 536 can utilize MIMO technology. The transceiver(s) 536 can comprise any sort of wireless transceivers capable of engaging in wireless, RF communication. The transceiver(s) 536 can also include other wireless modems, such as a modem for engaging in Wi-Fi, WiMAX, BLUETOOTH®, infrared communication, and the like. The transceiver(s) 536 may include transmitter(s), receiver(s), or both. In various implementations, the transceiver(s) 536 include one or more antennae configured to receive data wirelessly over one or more mmWave channels from the first device 502.

Example Clauses

A: A base station, including: a transceiver configured to receive a connection request from a user equipment (UE), to transmit an activation request to the UE, to receive a confirmation response from the UE, and to transmit guaranteed bit rate (GBR) downlink data to the UE; at least one processor; and memory storing instructions that, when executed by the at least one processor, cause the at least one processor to perform operations including: determining, based on the connection request, that the UE is requesting the GBR downlink data; determining that a first congestion level of a first millimeter wave (mmWave) downlink channel is below a first threshold; determining that a second congestion level of a second mmWave downlink channel is below a second threshold; causing the transceiver to transmit the activation request to the UE, the activation request instructing the UE to activate a first antenna corresponding to the first mmWave downlink channel and a second antenna corresponding to the second mmWave downlink channel; based on the activation request, receiving a confirmation response from the UE; and based on the confirmation response from the UE, causing the transceiver to transmit the GBR downlink data to the first antenna of the UE over the first mmWave downlink channel and to the second antenna of the UE over the second mmWave downlink channel.

B. The base station of clause A, the connection request being a first connection request, the UE being a first UE, the activation request being a first activation request, the confirmation response being a first confirmation response, wherein the transceiver is further configured to receive a second connection request from a second UE, to transmit a second activation request to the second UE, to receive a second confirmation response from the second UE, and to transmit non-GBR downlink data to the second UE, and wherein the operations further include: determining, based on the second connection request, that the second UE is requesting the non-GBR downlink data; causing the transceiver to transmit the second activation request to the second UE, the activation request instructing the second UE to activate a third antenna corresponding to the first mmWave downlink channel; and based on the second confirmation response from the second UE, causing the transceiver to transmit the non-GBR downlink data to the second UE over the first mmWave downlink channel without transmitting the non-GBR downlink data to the second UE over the second mmWave downlink channel.

C. The base station of clause A or B, wherein the first antenna is tuned to the first mmWave downlink channel without being tuned to the second mmWave downlink channel, and wherein the second antenna is tuned to the second mmWave downlink channel without being tuned to the first mmWave downlink channel.

D. A system, including: a transceiver configured to: receive, from a user equipment (UE), a connection request for prioritized data; transmit, to the UE, an activation request instructing the UE to activate a first antenna corresponding to the first mmWave downlink channel and to activate a second antenna corresponding to the second mmWave downlink channel; and transmit, to the UE, at least a portion of the prioritized data over a first mmWave downlink channel and a second mmWave downlink channel; at least one processor, and memory storing instructions that, when executed by the at least one processor, cause the at least one processor to perform operations including: determining that a first congestion level of the first mmWave downlink channel is below a first threshold; and determining that a second congestion level of the second mmWave downlink channel is below a second threshold.

E. The system of clause D, wherein the prioritized data includes at least one of guaranteed bit rate (GBR) data, ultra-reliable low latency communication (URLLC) data, data associated with greater than a threshold 5th Generation (5G) quality indicator (5QI), data associated with a particular priority level, data associated with lower than a threshold packet delay budget, or data associated with lower than a particular packet error rate.

F. The system of clause D or E, the connection request being a first connection request, the UE being a first UE, the activation request being a first activation request, wherein the transceiver is further configured to: receive, from a second UE, a second connection request for second downlink data, the second downlink data including non-prioritized data; transmit, to the second UE, a second activation request to the second UE, the second activation request instructing the second UE to activate a third antenna corresponding to the first mmWave downlink channel; and transmitting the non-prioritized data to the second UE over the first mmWave downlink channel without transmitting the non-prioritized data to the second UE over the second mmWave downlink channel.

G. The system of any one of clauses D to F, wherein the operations further include: determining, based on the connection request, that the UE is located in a mid-cell region of the system.

H. The system of any one of clauses D to G, wherein the operations further include: determining, based on the connection request, that a battery level of the UE is greater than a third threshold.

I. The system of any one of clauses D to H, the portion being a first portion, wherein the operations further include: determining that the first congestion level of the first mmWave downlink channel exceeds the first threshold; based on determining that the first congestion level of the first mmWave downlink channel exceeds the first threshold: causing the transceiver to transmit, to the UE, a deactivation request instructing the UE to deactivate the first antenna corresponding to the first mmWave downlink channel; and causing the transceiver to transmit, to the UE, a second portion of the downlink data over the second mmWave downlink channel.

J. The system of any one of clauses D to I, wherein the operations further include: predicting that a future congestion level of the first mmWave downlink channel is lower than a third threshold; and generating the activation request based on predicting that the future congestion level of the first mmWave downlink channel is lower than the third threshold.

K. The system of clause J, wherein the operations further include: identifying a trend of previous congestion levels of the first mmWave downlink channel, wherein predicting that the future congestion level of the first mmWave downlink channel includes is based on the trend.

L. A method, including: receiving, from a user equipment (UE), a connection request for downlink data; determining that a first congestion level of a first millimeter wave (mmWave) downlink channel is below a first threshold; determining that a second congestion level of a second mmWave downlink channel is below a second threshold; transmitting, to the UE, an activation request instructing the UE to activate a first antenna corresponding to the first mmWave downlink channel and to activate a second antenna corresponding to the second mmWave downlink channel; and transmitting at least a portion of the downlink data to the UE over the first mmWave downlink channel and the second mmWave downlink channel.

M. The method of clause L, wherein the downlink data includes at least one of guaranteed bit rate (GBR) data, ultra-reliable low latency communication (URLLC) data, data associated with greater than a threshold 5th Generation (5G) quality indicator (5QI), data associated with a particular priority level, data associated with lower than a threshold packet delay budget, or data associated with lower than a particular packet error rate.

N. The method of clause M, the connection request being a first connection request, the downlink data being first downlink data, the UE being a first UE, the activation request being a first activation request, wherein the method further includes: receiving, from a second UE, a second connection request for second downlink data, the second downlink data including non-GBR data; transmitting, to the second UE, a second activation request to the second UE, the second activation request instructing the second UE to activate a third antenna corresponding to the first mmWave downlink channel; and transmitting the second downlink data to the second UE over the first mmWave downlink channel without transmitting the second downlink data to the second UE over the second mmWave downlink channel.

O. The method of clause M or N, further including: determining, based on the connection request, that the UE includes the first antenna and the second antenna.

P. The method of any one of clauses M to O, wherein the method is performed by a base station, and wherein the method further includes: determining, based on the connection request, that the UE is located in a mid-cell region of the base station.

Q. The method of any one of clauses M to P, further including: determining, based on the connection request, that a battery level of the UE is greater than a third threshold.

R. The method of any one of clauses M to Q, the portion being a first portion, the method further including: determining that the first congestion level of the first mmWave downlink channel exceeds the first threshold; based on determining that the first congestion level of the first mmWave downlink channel exceeds the threshold: transmitting, to the UE, a deactivation request instructing the UE to deactivate the first antenna corresponding to the first mmWave downlink channel; and transmitting, to the UE, a second portion of the downlink data over the second mmWave downlink channel.

S. The method of any one of clauses M to R, further including: predicting that a future congestion level of the first mmWave downlink channel is lower than a third threshold, wherein transmitting the activation request is based on predicting that the future congestion level of the first mmWave downlink channel is lower than the third threshold.

T. The method of clause S, further including: determining a rate-of-change of the first congestion level of the first mmWave downlink channel, wherein predicting the future congestion level of the first mmWave downlink channel is based on the rate-of-change of the first congestion level of the first mmWave downlink channel.

While the example clauses described above are described with respect to one particular implementation, it should be understood that, in the context of this document, the content of the example clauses can also be implemented via a method, device, system, a computer-readable medium, and/or another implementation.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A base station, comprising:
a transceiver configured to receive a first connection request from a first user equipment (UE) and a second connection request from a second UE, to transmit a first activation request to the first UE and a second activation request to the second UE, to receive a first confirmation response from the first UE and a second confirmation response from the second UE, and to transmit guaranteed bit rate (GBR) downlink data to the first UE and non-GBR downlink data to the second UE;
at least one processor; and
memory storing instructions that, when executed by the at least one processor, cause the at least one processor to perform operations comprising:
determining, based on the first connection request, that the first UE is requesting the GBR downlink data;
determining, based on the second connection request, that the second UE is requesting the non-GBR downlink data;
determining that a first congestion level of a first millimeter wave (mmWave) downlink channel is below a first threshold;
determining that a second congestion level of a second mmWave downlink channel is below a second threshold;
causing the transceiver to transmit the first activation request to the first UE, the first activation request instructing the first UE to activate a first antenna corresponding to the first mmWave downlink channel and a second antenna corresponding to the second mmWave downlink channel;
causing the transceiver to transmit the second activation request to the second UE, the second activation request instructing the second UE to activate a third antenna corresponding to the first mmWave downlink channel;
based on the first activation request, receiving the first confirmation response from the first UE;
based on the second activation request, receiving the second confirmation response from the second UE;
based on the first confirmation response from the first UE, causing the transceiver to transmit the GBR downlink data to the first antenna of the first UE over the first mmWave downlink channel and to the second antenna of the first UE over the second mmWave downlink channel; and
based on the second confirmation response from the second UE, causing the transceiver to transmit the non-GBR downlink data to the second UE over the first mmWave downlink channel without transmitting the non-GBR downlink data to the second UE over the second mmWave downlink channel.

2. The base station of claim 1, wherein the first antenna is tuned to the first mmWave downlink channel without being tuned to the second mmWave downlink channel, and
wherein the second antenna is tuned to the second mmWave downlink channel without being tuned to the first mmWave downlink channel.

3. A system, comprising:
a transceiver configured to:
receive, from a first user equipment (UE), a first connection request for prioritized data;

transmit, to the first UE, a first activation request instructing the first UE to activate a first antenna corresponding to the first mmWave downlink channel and to activate a second antenna corresponding to the second mmWave downlink channel; and transmit, to the first UE, at least a portion of the prioritized data over a first mmWave downlink channel and a second mmWave downlink channel;

receive, from a second UE, a second connection request for second downlink data, the second downlink data comprising non-prioritized data;

transmit, to the second UE, a second activation request to the second UE, the second activation request instructing the second UE to activate a third antenna corresponding to the first mmWave downlink channel; and transmitting the non-prioritized data to the second UE over the first mmWave downlink channel without transmitting the non-prioritized data to the second UE over the second mmWave downlink channel;

at least one processor, and memory storing instructions that, when executed by the at least one processor, cause the at least one processor to perform operations comprising:

determining that a first congestion level of the first mmWave downlink channel is below a first threshold; and determining that a second congestion level of the second mmWave downlink channel is below a second threshold.

4. The system of claim 3, wherein the prioritized data comprises at least one of guaranteed bit rate (GBR) data, ultra-reliable low latency communication (URLLC) data, data associated with greater than a threshold $5^{th}$ Generation (5G) quality indicator (5QI), data associated with a particular priority level, data associated with lower than a threshold packet delay budget, or data associated with lower than a particular packet error rate.

5. The system of claim 3, wherein the operations further comprise:

determining, based on the first connection request, that the first UE is located in a mid-cell region of the system.

6. The system of claim 3, wherein the operations further comprise:

determining, based on the first connection request, that a battery level of the first UE is greater than a third threshold.

7. The system of claim 3, the portion being a first portion, wherein the operations further comprise:

determining that the first congestion level of the first mmWave downlink channel exceeds the first threshold;

based on determining that the first congestion level of the first mmWave downlink channel exceeds the first threshold:

causing the transceiver to transmit, to the first UE, a deactivation request instructing the first UE to deactivate the first antenna corresponding to the first mmWave downlink channel; and causing the transceiver to transmit, to the first UE, a second portion of the downlink data over the second mmWave downlink channel.

8. The system of claim 3, wherein the operations further comprise:

predicting that a future congestion level of the first mmWave downlink channel is lower than a third threshold; and generating the first activation request based on predicting that the future congestion level of the first mmWave downlink channel is lower than the third threshold.

9. The system of claim 8, wherein the operations further comprise:

identifying a trend of previous congestion levels of the first mmWave downlink channel, wherein predicting that the future congestion level of the first mmWave downlink channel comprises is based on the trend.

10. A method, comprising:

receiving, from a first user equipment (UE), a first connection request for first downlink data, the first downlink data comprising priority data;

receiving, from a second UE, a second connection request for second downlink data, the second downlink data comprising non-priority data;

determining that a first congestion level of a first millimeter wave (mmWave) downlink channel is below a first threshold;

determining that a second congestion level of a second mmWave downlink channel is below a second threshold;

transmitting, to the first UE, a first activation request instructing the first UE to activate a first antenna corresponding to the first mmWave downlink channel and to activate a second antenna corresponding to the second mmWave downlink channel;

transmitting at least a portion of the first downlink data to the first UE over the first mmWave downlink channel and the second mmWave downlink channel;

transmitting, to the second UE, a second activation request instructing the second UE to activate a third antenna corresponding to the first mmWave downlink channel; and transmitting the second downlink data to the second UE over the first mmWave downlink channel without transmitting the second downlink data to the second UE over the second mmWave downlink channel.

11. The method of claim 10, wherein the first downlink data comprises at least one of guaranteed bit rate (GBR) data, ultra-reliable low latency communication (URLLC) data, data associated with greater than a threshold $5^{th}$ Generation (5G) quality indicator (5QI), data associated with a particular priority level, data associated with lower than a threshold packet delay budget, or data associated with lower than a particular packet error rate.

12. The method of claim 10, further comprising:

determining, based on the first connection request, that the first UE comprises the first antenna and the second antenna.

13. The method of claim 10, wherein the method is performed by a base station, and wherein the method further comprises:

determining, based on the first connection request, that the first UE is located in a mid-cell region of the base station.

14. The method of claim 10, further comprising:

determining, based on the first connection request, that a battery level of the first UE is greater than a third threshold.

15. The method of claim 10, the portion being a first portion, the method further comprising:

determining that the first congestion level of the first mmWave downlink channel exceeds the first threshold;

based on determining that the first congestion level of the first mmWave downlink channel exceeds the threshold:

transmitting, to the first UE, a deactivation request instructing the first UE to deactivate the first antenna corresponding to the first mmWave downlink channel; and transmitting, to the first UE, a second portion of the downlink data over the second mmWave downlink channel.

16. The method of claim 10, further comprising:

predicting that a future congestion level of the first mmWave downlink channel is lower than a third threshold, wherein transmitting the first activation request is based on predicting that the future congestion level of the first mmWave downlink channel is lower than the third threshold.

17. The method of claim 16, further comprising:

determining a rate-of-change of the first congestion level of the first mmWave downlink channel, wherein predicting the future congestion level of the first mmWave downlink channel is based on the rate-of-change of the first congestion level of the first mmWave downlink channel.

\* \* \* \* \*